(12) United States Patent
Fan

(10) Patent No.: US 10,104,263 B2
(45) Date of Patent: Oct. 16, 2018

(54) SYSTEM, APPARATUS AND METHOD FOR DOCUMENT PROCESSING INCLUDING DOCUMENT STAMPING ACCORDING TO SPECIFIED STAMPER SETTINGS

(71) Applicant: Qinlei Fan, Frisco, TX (US)

(72) Inventor: Qinlei Fan, Frisco, TX (US)

(73) Assignee: RICOH COMPANY, LTD., Tokyo (JP)

( * ) Notice: Subject to any disclaimer, the term of this patent is extended or adjusted under 35 U.S.C. 154(b) by 18 days.

(21) Appl. No.: 15/044,561

(22) Filed: Feb. 16, 2016

(65) Prior Publication Data
US 2017/0235532 A1    Aug. 17, 2017

(51) Int. Cl.
| | |
|---|---|
| G06K 15/02 | (2006.01) |
| G06F 3/12 | (2006.01) |
| H04N 1/04 | (2006.01) |
| H04N 1/00 | (2006.01) |
| H04N 1/32 | (2006.01) |

(52) U.S. Cl.
CPC ........... H04N 1/04 (2013.01); H04N 1/00466 (2013.01); H04N 1/32133 (2013.01); H04N 1/32144 (2013.01); H04N 2201/3266 (2013.01); H04N 2201/3271 (2013.01)

(58) Field of Classification Search
CPC .... G06F 3/1256; G06F 3/1208; G06F 3/1203; G06F 3/1205; H04N 1/04; H04N 1/00413; H04N 1/32144
USPC ................................................. 358/1.13, 1.15
See application file for complete search history.

(56) References Cited

U.S. PATENT DOCUMENTS

| | | | | |
|---|---|---|---|---|
| 6,396,594 | B1 * | 5/2002 | French | H04N 1/00 358/1.15 |
| 2005/0185225 | A1 * | 8/2005 | Brawn | H04N 1/00 358/401 |
| 2006/0221372 | A1 * | 10/2006 | Onishi | G06F 3/1204 358/1.13 |
| 2007/0188810 | A1 * | 8/2007 | Nakagama | H04N 1/00037 358/2.1 |
| 2007/0229920 | A1 * | 10/2007 | Fukushima | H04N 1/00795 358/488 |
| 2009/0051950 | A1 * | 2/2009 | Honma | H04N 1/3871 358/1.2 |

(Continued)

OTHER PUBLICATIONS

U.S. Appl. No. 14/735,251, Tom Haapanen Qinlei Fan, Offline Mobile Capture.

(Continued)

*Primary Examiner* — Benny Q Tieu
*Assistant Examiner* — Juan M Guillermety
(74) *Attorney, Agent, or Firm* — Cooper & Dunham LLP

(57) ABSTRACT

Tools (e.g., a device administration application) may be provided to permit a document production administrator to configure stamper parameters and to pick and choose parameters to be made available for setting by users of a multi-function document processing (MFP) device, for example, via a graphical user interface (GUI) provided on the operational display of the MFP device. The device administration application may be configured to permit the document production administrator to configure, from a user terminal or from the MFP device, a stamper GUI portion of a graphical user interface (GUI) provided on the operational display of the MFP device.

17 Claims, 11 Drawing Sheets

(56) References Cited

U.S. PATENT DOCUMENTS

| | | | | |
|---|---|---|---|---|
| 2009/0296128 | A1* | 12/2009 | Hasegawa | G06F 3/1204 358/1.14 |
| 2010/0007911 | A1* | 1/2010 | Ferlitsch | G06F 3/1204 358/1.15 |
| 2011/0194785 | A1* | 8/2011 | Oi | H04N 1/32149 382/254 |
| 2012/0075671 | A1* | 3/2012 | Ogawa | H04N 1/00424 358/1.15 |
| 2015/0183208 | A1* | 7/2015 | Yamawaki | B26F 1/0092 399/407 |
| 2015/0227327 | A1* | 8/2015 | Akiyama | G06F 3/1256 358/1.15 |
| 2015/0312437 | A1* | 10/2015 | Hamaguchi | H04N 1/04 358/474 |
| 2016/0227062 | A1* | 8/2016 | Miyazaki | H04N 1/00477 |

OTHER PUBLICATIONS

U.S. Appl. No. 14/965,401, Qinlei Fan Yuuki Ohtaka, Flexible Workflow.
U.S. Appl. No. 14/735,251, Tom Haapanen et al., filed Jun. 10, 2015.
U.S. Appl. No. 14/965,401, Qinlei Fan et al., filed Dec. 10, 2015.

* cited by examiner

Properties

Display the button on the Service Menu ○ Yes ● No

Stamper Settings

Display Name: [PDF Stamper]

General Settings

PDF Preview

| | | |
|---|---|---|
| Prefix | | Leading Spaces [0 ◀▶] |
| Suffix | | Trailing Spaces [0 ◀▶] |
| Counter Start | [1 ◀▶] | |
| Number of Digits | [4 ◀▶] | ■ Include Leading Zeros |
| Vertical | [Top ▶] | Horizontal [Right ▶] |
| Font Family | [Helvetica ▶] | Font Style [Normal ▶] |
| Font Size | [10 ▶] | Font Color [Black ▶] |
| Page Size | [A4 ▶] | Page Orientation ● Portrait ○ Landscape |

[Show Preview]

[Ok] [Cancel]

Fig. 7

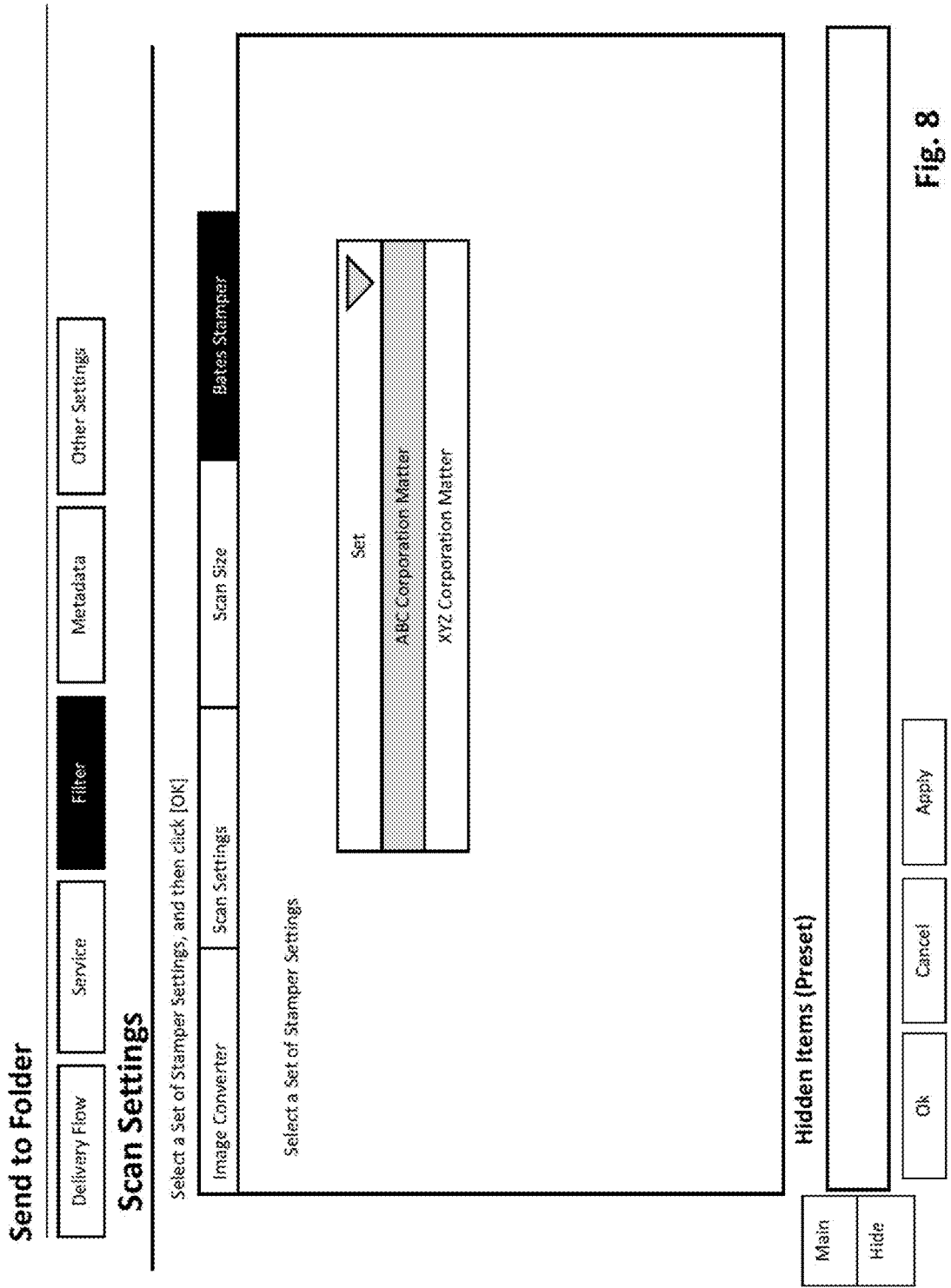

SYSTEM, APPARATUS AND METHOD FOR DOCUMENT PROCESSING INCLUDING DOCUMENT STAMPING ACCORDING TO SPECIFIED STAMPER SETTINGS

TECHNICAL FIELD

This disclosure relates to systems, apparatuses, application software (and modules) and methodologies for document processing, and more specifically, to such systems, apparatuses, application software and methodologies including provisions to process scan document images according to specified stamper settings for document identifier stamping.

BACKGROUND

In the current information age, information technology (IT) tools play a significant role in our daily activities, and there are often discussions of the desirableness of a paperless society. Information technology tools are typically employed as a means to improve efficiency in the workplace (as well as elsewhere). For example, scanners and multi-function peripherals (MFP) may be utilized to convert hardcopy documents into electronic form, thereby decreasing the need for physical storage space and at the same time allowing the information in the paper documents to be transmitted quickly and more readily.

In such circumstances, as well as others, an often-repeated process can be streamlined by employing workflow tools, such that the sequence of operations in the process may be automated, as much as possible. For example, document workflow software may be provided to specify a document workflow process for scan document delivery from MFP, such as in an enterprise environment. Such document workflow process may include, for example, (i) scan hardcopy document to obtain document image, (ii) convert document image to multi-page PDF file, (iii) apply watermark thereto, and (iv) send watermarked image(s) to document management server or email.

In many contexts, there may be a need to stamp each document (or set of documents) with a document identifier, to more efficiently identify or classify a particular document. In many instances, such identifier is mechanically or even manually applied to a hardcopy document, in a less-than-efficient manner.

Even when a document workflow system permits an identifier to be superposed as image data in the document image in a document workflow process, such system requires a high-level of user interaction or, in the case of multiple user, high-level of user-coordination. That is, in the case that the identifier includes a numerical identifier unique to the particular document, it must be ensured that the numerical identifier is applied to a single document and not to any other documents. Further, when identifier prefix or suffix is included in the document identifier to categorize or specify the specific matter for which the document is being produced or reproduced, there are many instances in which it is mandatory or imperative that such prefix or suffix is accurate and appropriate and therefore user error will not be acceptable.

There is a need for provisions to permit, for example, in a legal arena, a document-handling user to select a matter or case for which the document is being produced or reproduced, without requiring the document-handling user to specify, each time a document is being produced or reproduced, the document identifier to be applied to the produced or reproduced document.

SUMMARY

Various tools (for example, a system, an apparatus, application software, etc.) can be provided to facilitate document identifier stamping according to specified stamper settings, in a document processing system in which a document scanner is provided to scan a hardcopy document and generate scan document images that may be submitted to a document identifier stamper module for further processing, as needed and according to stamper settings.

In an aspect of this disclosure, a device administration application may be provided to permit a document production administrator to configure stamper parameters and to pick and choose parameters to be made available for setting by users of a multi-function document processing (MFP) device, for example, via a graphical user interface (GUI) provided on the operational display of the MFP device. The device administration application permits the document production administrator to configure, from a user terminal or from the MFP device, a stamper GUI portion to be provided on the operational display of the MFP device.

In an aspect, the document processing system maintains sets of stamper settings, for respective cases or matters, with each set of stamper settings being associated with a stamper display name. The stamper GUI portion configured via the device administration application may display the stamper display name of each of the sets of stamper settings in order to permit the device user to select one of the sets of stamper settings that is to be applied.

For example, the device administration application may provide a general settings GUI to permit the document production administrator to specify aspects of the document identifier image that cannot be changed by the device user, and the device administration application may also provide a configuration GUI to permit the document production administrator to specify provisions in the stamper GUI portion that allow the device user to specify other aspects of the document identifier image.

In another aspect, the document identifier image overlay may be imprinted by the document identifier stamper module on the scan document image and may capture a document identifier including a Bates number unique to the particular document image. The general settings GUI may permit the document production administrator to specify at least one of a prefix and a suffix to be applied, in addition to the Bates number, in the document identifier.

In another aspect, the general settings GUI may permit the document production administrator to specify a number of digits to be allocated for the Bates number, in the document identifier. The document identifier image may additionally include date and time marks.

In another aspect, the device administration application may provide a stamper preview part in the stamper GUI portion to permit preview of the document identifier image to be applied based on a specified set of stamper settings.

In another aspect, the document identifier stamper module may imprint, on each particular document image amongst the scan document images, a document identifier image that is unique to, and uniquely identifies, a particular document image, and then generate an output file that captures the set of scan document images with overlay of respective unique document identifier images.

In another aspect, the document identifier image overlay placed on the scan document image by the document identifier stamper module may be over-transparent to the scan document image so as to keep the image information on the scan document image that overlaps with the document identifier image visible. Thus, the document identifier image will not obscure the image data of the scan document image.

In another aspect, the stamper GUI portion may include provisions for a user to specify relative positioning in a vertical direction and relative positioning in a horizontal direction in which to overlay the document identifier image on the scan document image in the output file. The document identifier image may be imprinted at the same position on each document image amongst the scan document images captured in the output file by the document identifier stamper module. Such image may be imprinted in accordance with the relative positioning in the vertical direction and relative positioning in the horizontal direction as specified by the user through the stamper GUI portion.

In another aspect, the document identifier image overlay placed by the document identifier stamper module on the scan document image in the output file captures a document identifier including a Bates number that is unique to the particular image. The document identifier stamper module maintains for each set of stamper settings, a display name and a Bates number counter that registers a next Bates number to be used with the set of stamper settings.

In another example, the stamper GUI portion may include provisions for the user to select a font to be used for the document identifier from plural candidate fonts. Such font may be independent of the fonts used for the hardcopy document or the scan document images in captured in the output file. The stamper GUI portion may also include provisions for the user to select a font color to be used for the document identifier from plural color candidates. Such font color may be independent of the font colors used for the hardcopy document or the scan document images in captured in the output file. The stamper GUI portion may also include provisions to allow the user to specify an orientation of the document identifier relative to the scan document image in the output file.

In another aspect, the stamper GUI portion includes provisions for a user to specify a margin to be appended to each document image amongst the scan document images. For each document image amongst the scan document images captured in the output file, the document identifier may be imprinted by the document identifier stamper module in the appended margin on the document image.

BRIEF DESCRIPTION OF THE DRAWINGS

The aforementioned and other aspects, features and advantages can be more readily understood from the following detailed description with reference to the accompanying drawings wherein:

FIG. 7 shows an example of a GUI screen that can be provided by a device administration application, in any of the systems shown in FIGS. 2A and 2B;

FIG. 8 shows an example of a GUI screen that can be provided by an operational display (such as in any of the systems shown in FIGS. 1, 2A and 2B), according to an exemplary embodiment;

DETAILED DESCRIPTION

Figure 1:
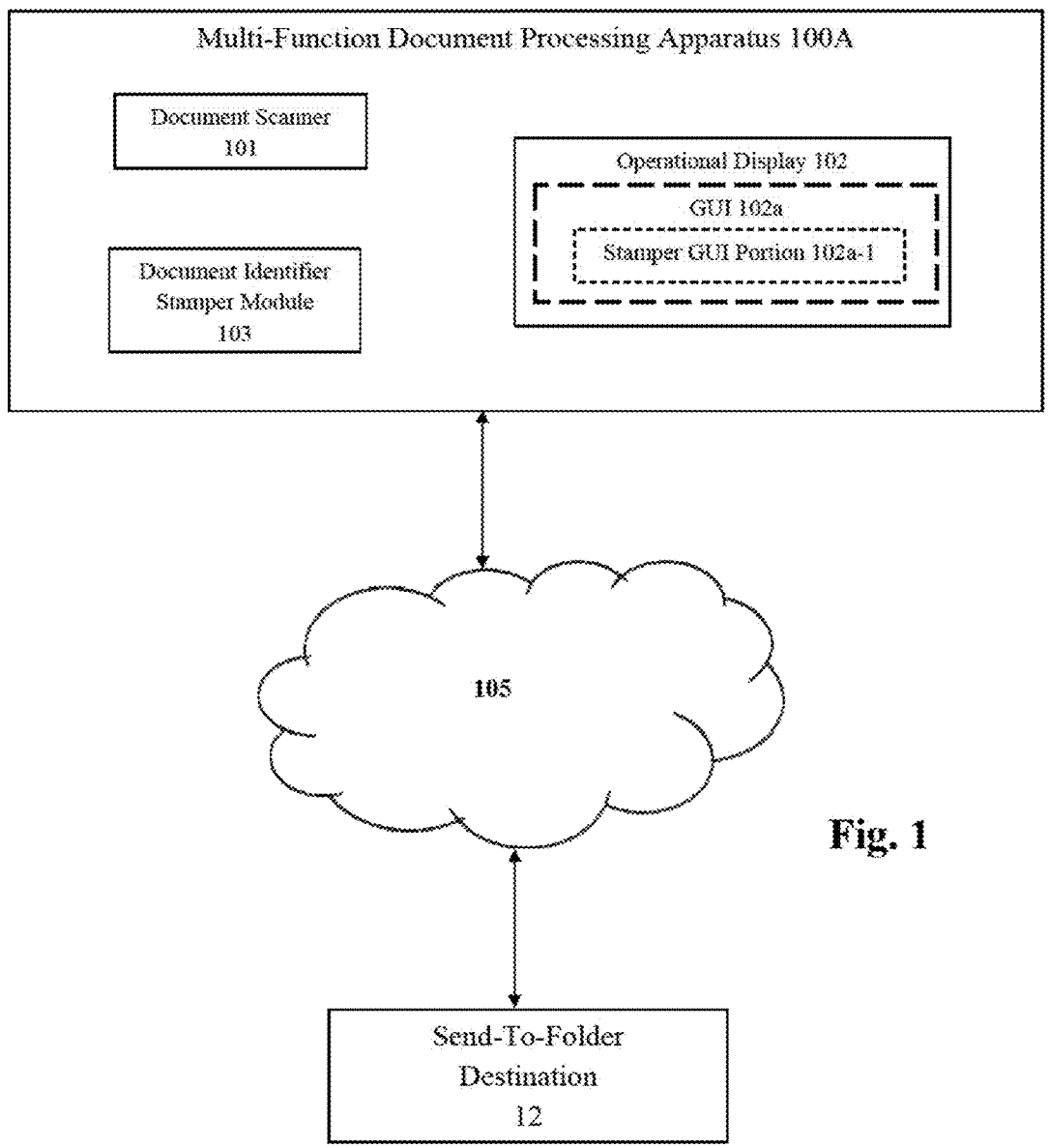
FIG. 1 shows a block diagram of a document processing system, according to an exemplary embodiment.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations will be omitted when it may obscure the subject matter of the present invention.

Various tools are discussed herein to facilitate document processing of scan document images. It should be appreciated by those skilled in the art that one or more of such tools may be embodied in software and/or in any of various other ways and thus while various examples are discussed herein, the inventive subject matter of this disclosure is not limited to such examples described herein.

Referring now to the drawings, wherein like reference numerals designate identical or corresponding parts throughout the several views, FIG. 1 shows schematically document processing system 10 in which multi-function document processing apparatus 100A and a send-to-folder destination 12 are each connected to network 105.

Figure 5:
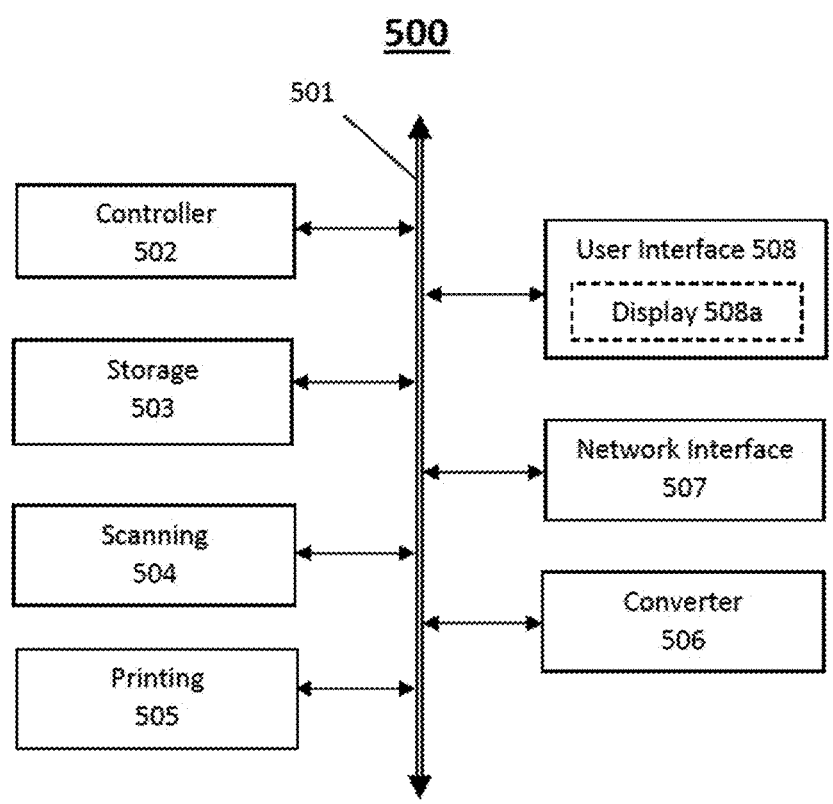
FIG. 5 shows a block diagram of an exemplary configuration of a multi-function device that can be configured to operate as a multi-function document processing device, referenced in any of FIGS. 1, 2A and 2B.

The multi-function document processing apparatus 100A includes document scanner 101, operational display 102 and a document identifier stamper module 103, and is configured to communicate with other devices (such as the send-to-folder destination 12) connected to the network 105 via a network interface (e.g., 507 in FIG. 5). Such communication may entail sending scan document images (or a file containing such images) to have processing performed thereon by other devices connected to the network 105. Further, the multi-function document processing apparatus 100A may also include storage capabilities thereby allowing the multi-function document processing apparatus 100A to store information received via the network 105.

While this example of this disclosure simply refers, in the interest of brevity, to a single multi-function document processing apparatus 100A, it should be appreciated that the network environment can have an arbitrary number of multi-function document processing apparatuses.

In an exemplary embodiment, the multi-function document processing apparatus 100A may be an MFP. The term "MFP" is used herein generically to include any multifunction image forming device having a scanning functionality, in addition to one or more other functionalities (e.g., printing or plotting, copy, fax, scan-to-email, send-to-folder or scan-to-store, etc.). The multi-function document processing apparatus 100A may be configured as shown in FIG. 5, which is discussed infra.

The document scanner 101 is configured to have a scanning function to scan physical (i.e. hardcopy) documents and generate scan document images that can be processed by the apparatus 100A (e.g., document identifier stamper module 103) or another computing device (e.g., document identifier stamper module 103) depending on stamper settings selected by the user of the apparatus 100A. In an example, a user of the apparatus 100A may perform scanning by inputting hardcopy documents via a glass platen or an automatic document feeder (ADF). The scanning function of the document scanner 101 is a conventional feature of scanning devices and therefore, in the interest of brevity, is not discussed further.

The operational display 102 provides a graphical user interface (GUI) 102a which includes a stamper GUI portion 102a-1. The stamp GUI portion 102a-1 can be utilized by a user (e.g. administrator) to specify stamper settings for stamping of documents which may be for the purpose of identifying such documents. When hardcopy documents are placed in or on the document scanner 101 and a set of scan document images is generated, the scan document images may be submitted for further processing, such as by the document identifier stamper module 103.

The document identifier stamper module 103 performs processing or further processing on one or more scan document images received from the multi-function document scanner 101. When the document identifier stamper module 103 receives the scan document images from the document scanner 101, the document identifier stamper module 103 processes the scan document images, based on the specified stamper settings. More specifically, the document identifier stamper module imprint, on each particular document image amongst the scan document images, a document identifier image that is unique to, and uniquely identifies, the document image. The document identifier stamper module 103 then generates an output file capturing the set of scan document images with overlay of respective unique document identifier images. The output file may be transmitted via scan-to-email functionality or send-to-folder or scan-to-store functionality (such as to a document management system). The output file may be captured in a PDF format, with imprints on the PDF document. A PDF converter filter can be used to convert the scanned image into a PDF file, and the supported image formats that can be passed to such filter include, for example (but not limited to), TIFF, TIFF-F, DCX, BMP, JPEG, PNG, and GIF.

Figure 10:
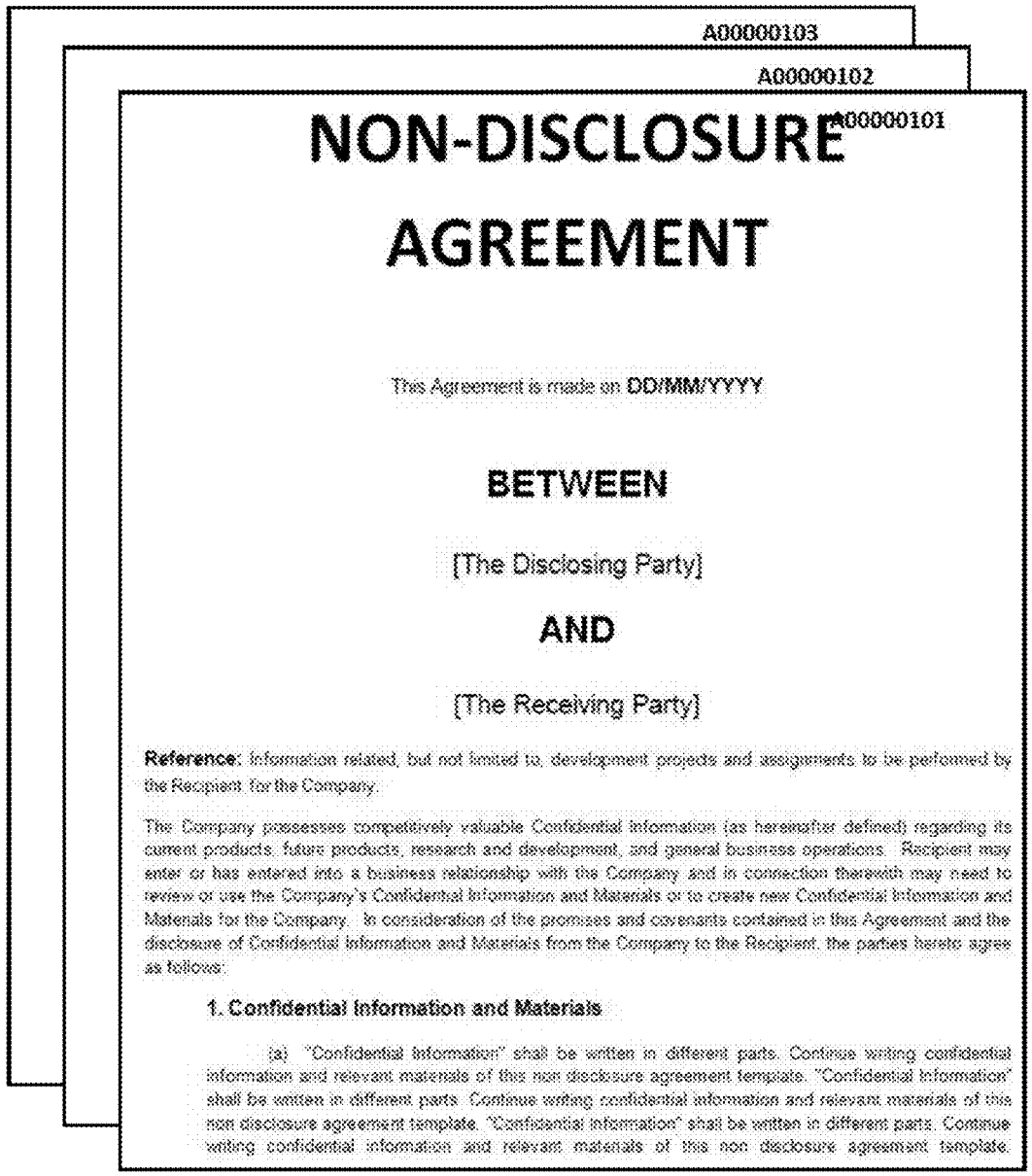
FIG. 10 shows an example of a output file that can be generated by the document processing apparatus, such as in any of the systems shown in FIGS. 1, 2A and 2B.

The overlay placed on the scan document image in the output file by the document identifier stamper module 103 is over-transparent to the scan image so as to keep image information on the scan document image overlapping with the document identifier image visible, as shown in FIG. 10. In overlaying the document identifier image on the scan document image in the output image, a setting to specify the relative positioning in a vertical direction and the relative positioning in a horizontal direction may be utilized, as shown in FIG. 7 and discussed in more detail below. The document identifier image may be imprinted at the same position on each document image amongst the scan document images captured in the output file by the document identifier stamper module 103 in accordance with such relative positioning in a vertical direction and the relative positioning in a horizontal direction, as specified by the user in the stamper GUI portion 102a-1.

In another example, the document identifier image overlay on the scan document image in the output file may capture a document identifier including a Bates number unique to the particular document image, as shown in FIG. 10. A Bates number is a number used primarily in legal, medical, and business areas to uniquely identify each page in a set of documents by assigning a series of incrementing numbers. For example, a series of documents produced in response to a legal discovery request may utilize the Bates number system. Further, certain numbers may indicate that a particular document should be treated with a specified level of confidentiality moving forward in a litigation.

The document identifier stamper module 103 may maintain one or more sets of stamper settings of such Bates numbers unique to the particular document image. Each set of stamper settings may have a stamper display name and a Bates number counter that registers a next Bates number that is to be used with the particular set of stamper settings. The stamper GUI portion 102a-1 may display the stamper display name of each of the sets of stamper settings to permit the user to select which of the sets of stamper settings is to be applied, as shown in FIG. 8.

In another example, the stamper GUI portion 102a-1 may include provisions for the user to select from plural candidate fonts a font to be used for the document identifier. Such font may be independent of fonts used for the hardcopy document or the scan document images captured in the output file. The stamper GUI portion 102a-1 may also include provisions for the user to select from plural color candidates a font color to be used for the document identifier, and such color may be independent of any colors that may have been used for the hardcopy document or the scan document images captured in the output file. Additionally, the stamper GUI portion 102a-1 may include provisions allowing the user to specify an orientation of the document identifier relative to the scan document image in the output file.

The send-to-folder destination 12 can be a document management server, a file server, a workstation, another computing device, networked storage connected through the network 105, another storage device, etc. In addition, as the skilled artisan may appreciate, although the send-to-folder destination 12 is shown in FIG. 1 as a distinct device, it may alternatively be integral to the MFP.

Figure 2A:
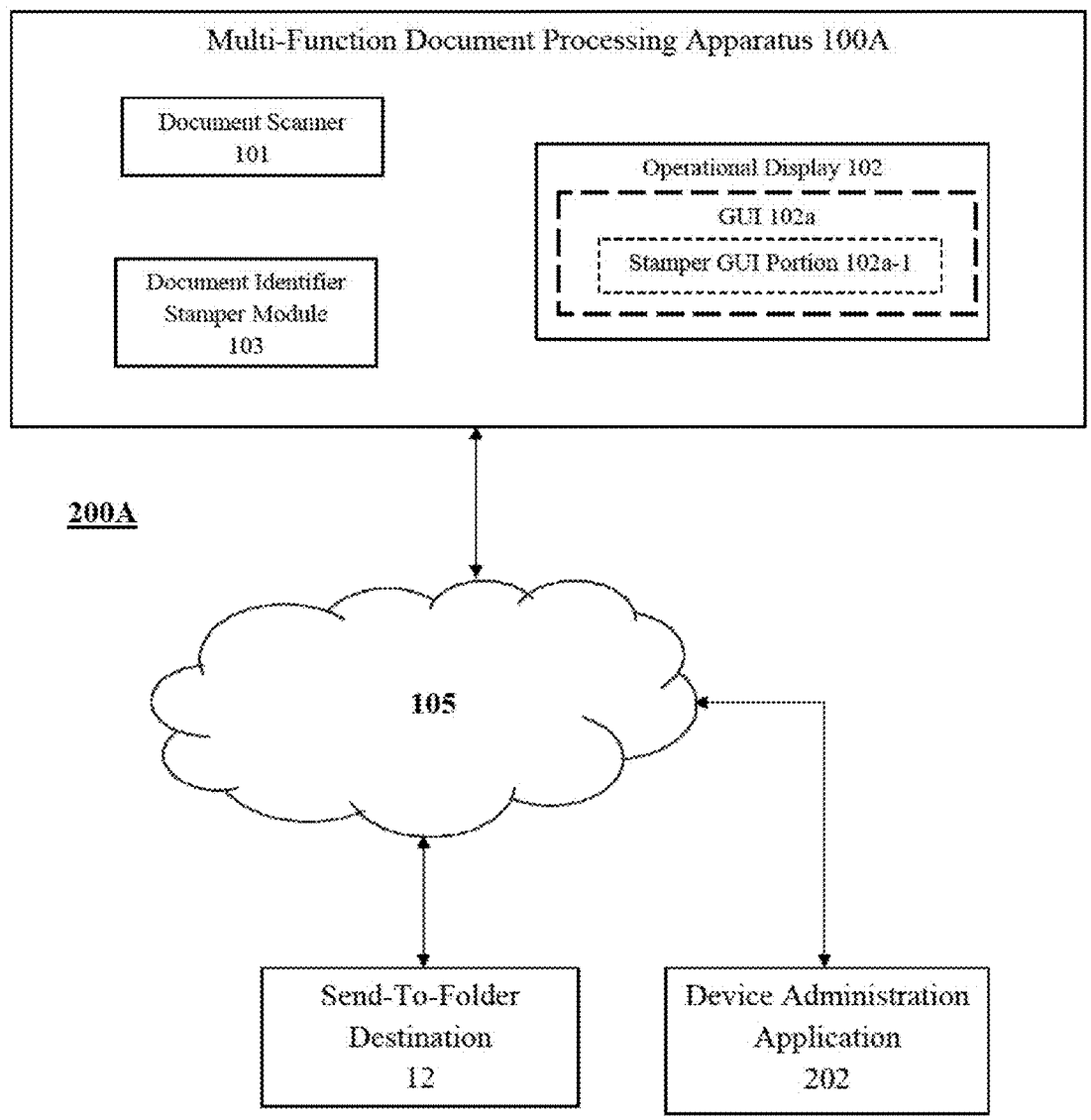
FIG. 2A shows a block diagram of a document processing system, according to another exemplary embodiment.

FIG. 2A shows schematically a system 200A, according to an exemplary embodiment. The system comprises a multi-function document processing device 201 which includes document scanner 101 and operational display 102, document identifier stamper module 103, and a device administration application 202.

In an exemplary embodiment, the multi-function document processing device 201 may be an MFP. The term "MFP" is used herein generically to include any multifunction output device having a scanning functionality, in addition to one or more other functionalities (e.g., printing or plotting, copy, fax, scan-to-email, scan-to-store, etc.). The multi-function document processing device 201 may be configured as shown in FIG. 5, which is discussed infra.

The device administration application 202 may be installed onto a computer (e.g. FIG. 4) to allow a document production administrator to configure the stamper GUI portion 102*a*-1 to be provided on the operational display 102 of the multi-function document processing device 201 to permit a device user to specify stamper settings for document identifier stamping. For example, the document production administrator may specify which stamper settings will be the default settings for the document identifier stamping and which stamper settings the user of the multi-function document processing device 201 can specify on the operational display 102 of the device.

Figure 2B:
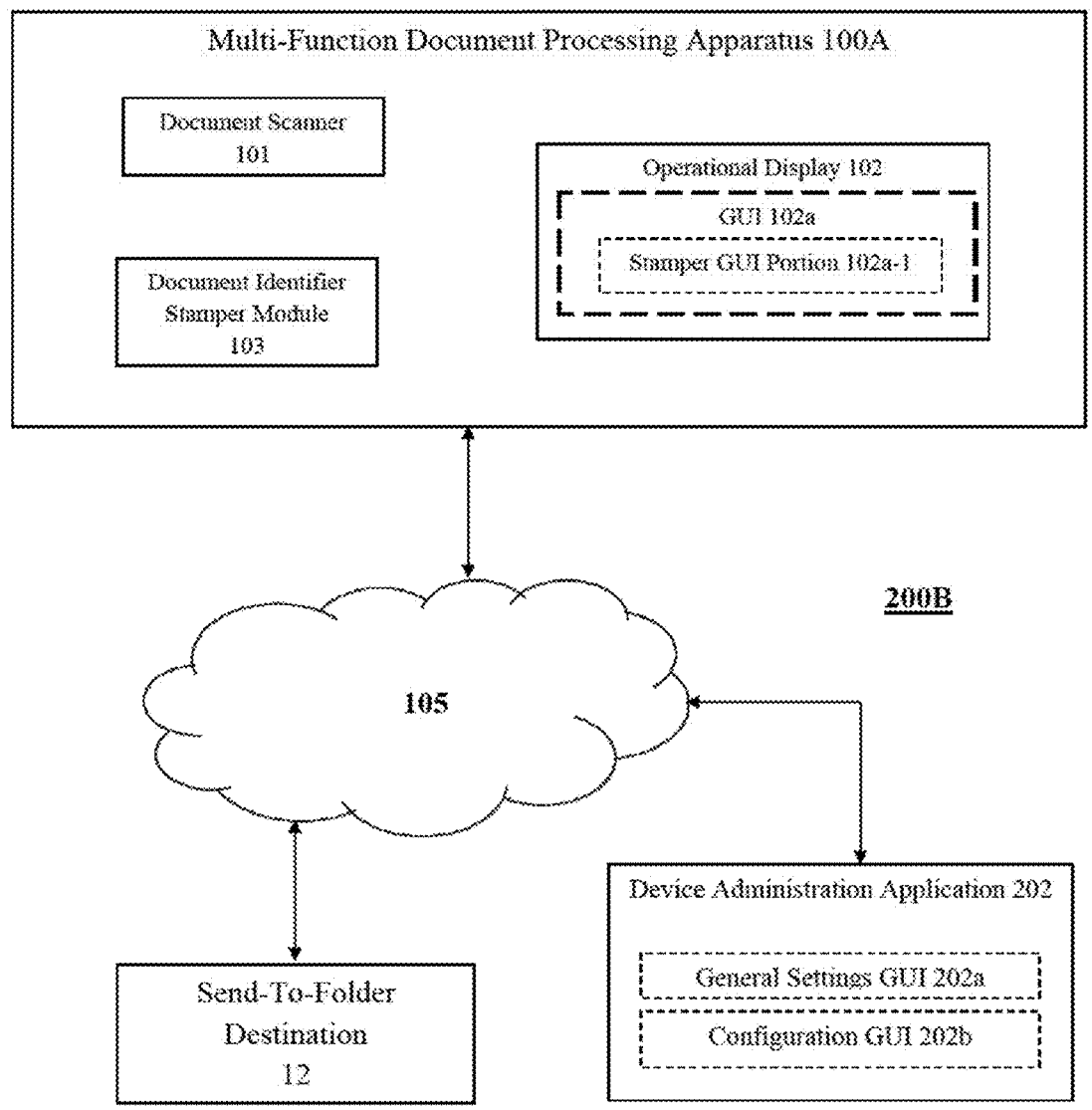
FIG. 2B shows a block diagram of a document processing system, according to another exemplary embodiment.

FIG. 2B shows schematically a system 200B, according to another exemplary embodiment. The system comprises a multi-function document processing device 201 which includes document scanner 101 and operational display 102, document identifier stamper module 103, and device administration application 202 which may include general settings GUI 202*a* and configuration GUI 202*b*.

Figure 6:
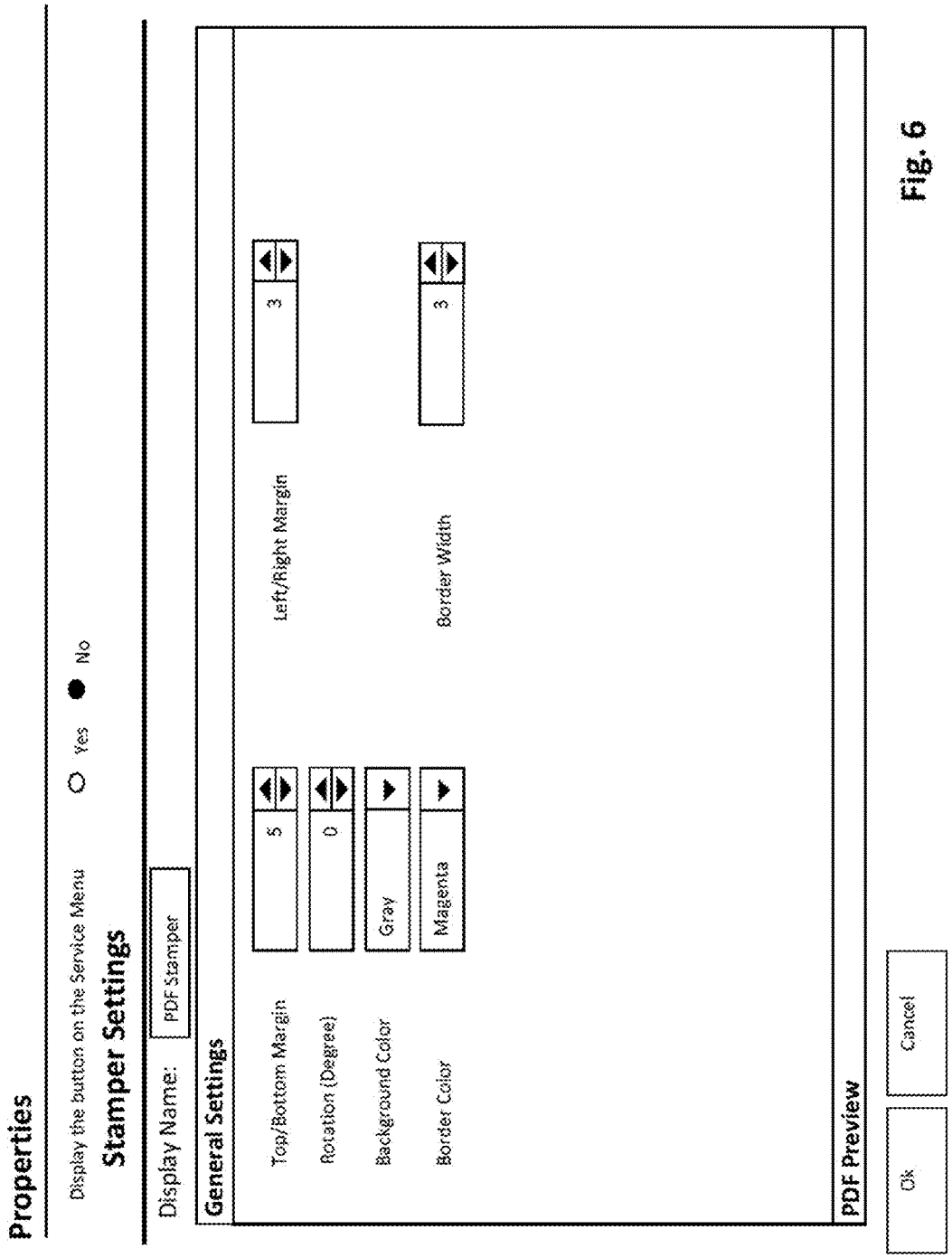
FIG. 6 shows an example of a graphical user interface (GUI) screen that can be provided by a device administration application, in any of the systems shown in FIGS. 2A and 2B.
Figure 9:
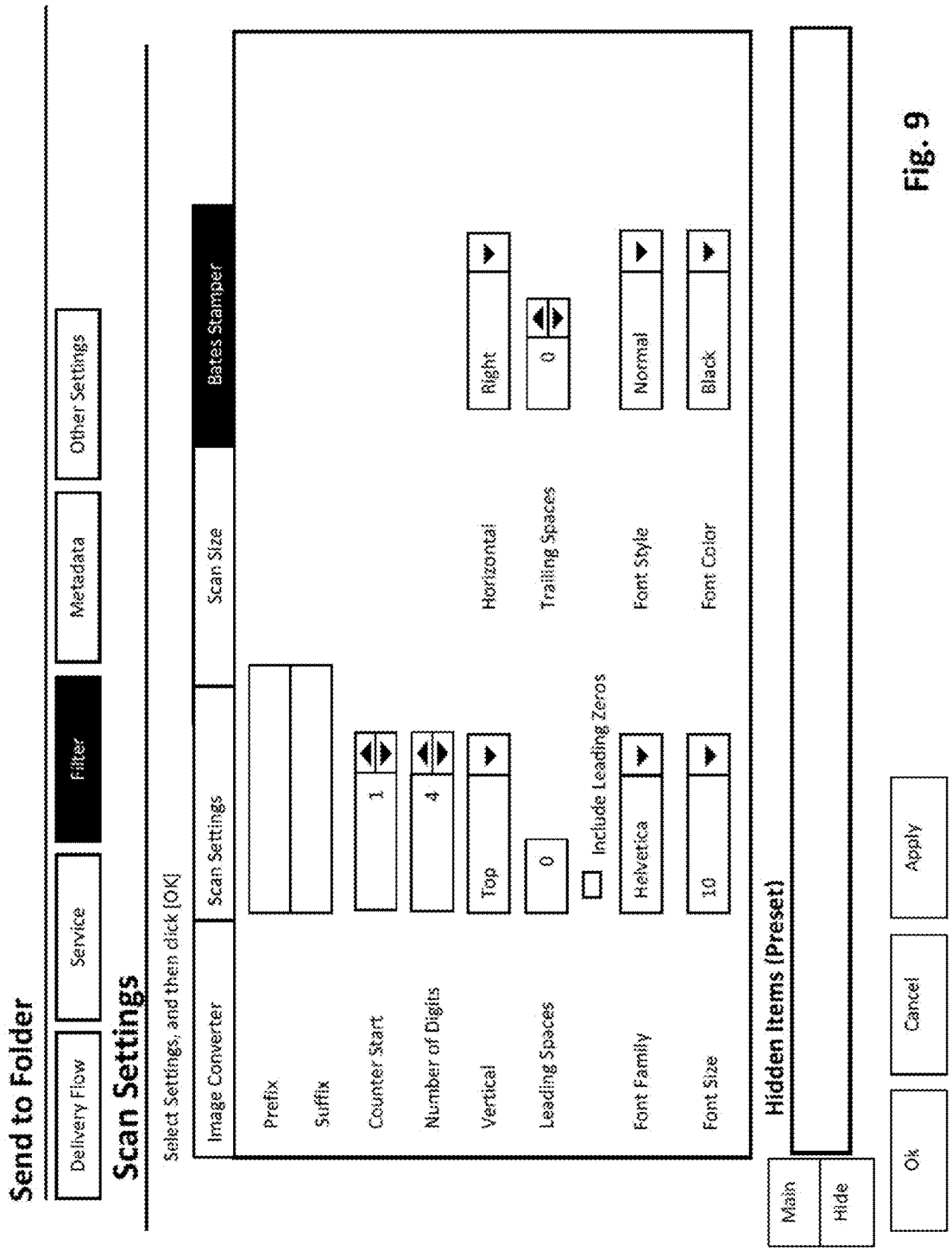
FIG. 9 shows an example of a configuration GUI screen that can be provided by an operational display (such as in any of the systems shown in FIGS. 1, 2A and 2B), according to another exemplary embodiment.

In many instances, an administrator would make it a highly simplistic process for the device user, and the general settings GUI 202*a* may permit the document production administrator to specify aspects of the document identifier image that cannot be changed by the device user, such as shown in FIG. 6. On the other hand, in another embodiment, the configuration GUI may permit the administrator to specify provisions in the stamper GUI portion for the device user to specify other aspects of the document identifier image, as shown in FIG. 9.

The device administration application 202 may be configured to maintain one or more sets of stamper settings, and each set of stamper settings may be associated with a particular stamper display name. The stamper GUI portion 102*a*-1 may display such stamper display names to permit the device user to select one of the sets of stamper settings to be applied, as shown in FIG. 8.

In another aspect, the document identifier image overlay to be imprinted by the document identifier stamper module 103 on the scan document image may capture a document identifier including a Bates number unique to the particular document image. The general settings GUI 202*a* may permit the document production administrator to specify, in addition to such Bates number, at least one of a prefix and a suffix to be added to the document identifier, as shown in FIG. 7. The general settings GUI 202*a* may also permit the document production administrator to specify a number of digits to be allocated for the Bates number in the document identifier.

In an example, the device administration application 202 may provide a stamper "PDF Preview" part in the stamper GUI portion, as shown in FIG. 7. The stamper preview part permits a user to view a preview of the document identifier image to be applied based on the specified set of stamper settings.

In another aspect, the document identifier image may include date and time marks for a particular document identifier image.

It should be noted that there may be many methods for configuring the stamper settings of the multi-function document processing device 201. In one embodiment, the administrator may configure the settings for the multi-function processing device 201 on an external device (e.g., server, personal computer, laptop, etc.) and push such settings to the MFP, as the multi-function processing device 201 may be connected (e.g., via Internet, LAN, WAN, direct cable, etc.) to such external device. In other words, it is not necessary to have the settings specified by the user of the multi-function processing device 201. In another embodiment, the administrator may remotely access the multi-function processing device 201 and configure the stamper settings remotely. Even when the administrator utilizes such remote access to the multi-function processing device 201, the device user of the multi-function processing device 201 may not have to specify stamper settings.

The network 105 can be a local area network, a wide area network or any type of network such as an intranet, an extranet (for example, to provide controlled access to external users, for example through the Internet), a private or public cloud network, the Internet, etc., or a combination thereof. In addition, the network 105 preferably uses TCP/IP (Transmission Control Protocol/Internet Protocol), but other protocols such as SNMP (Simple Network Management Protocol) and HTTP (Hypertext Transfer Protocol) can also be used. How devices can connect to and communicate over networks is well known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

Figure 3:
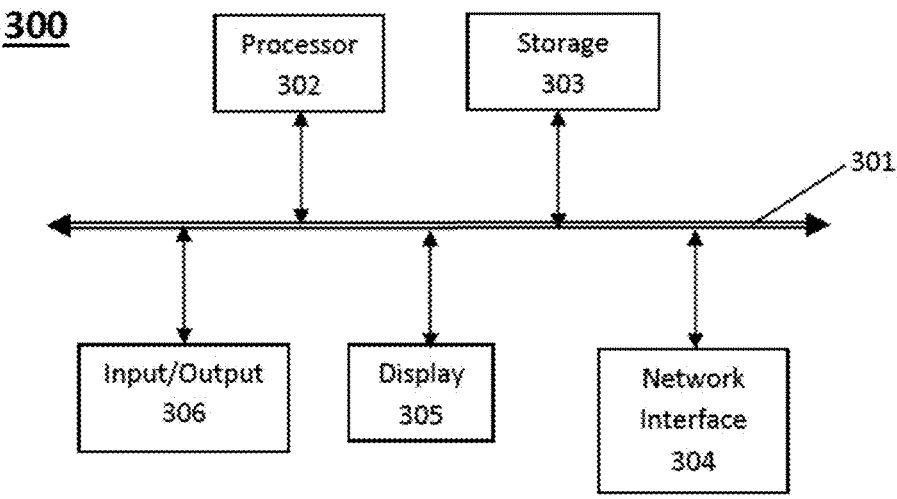
FIG. 3 shows a block diagram of an exemplary configuration of a computing device, that can be configured by programming to operate as a send-to-folder destination, referenced in any of FIGS. 1, 2A and 2B.

FIG. 3 shows an exemplary constitution of a computing device that can constitute the send-to-folder destination 12 (such as, e.g., a document management server, a file server, a workstation, another computing device, networked storage, another storage arrangement, etc.), in any of the systems shown in FIGS. 1, 2A and 2B. In FIG. 3, apparatus 300 includes a processor (or central processing unit) 302 that communicates with a number of other components, including memory or storage part 303, network interface 304, display 305 and other input/output (e.g., keyboard, mouse, etc.) 306, by way of a system bus 301. The apparatus 300 may be a special-purpose device (such as including one or more application specific integrated circuits or an appropriate network of conventional component circuits) or it may be software-configured on a conventional server computer, computer workstation or personal computer with sufficient memory, processing and communication capabilities to operate as a server, as should be appreciated to those skilled in the relevant arts.

In the apparatus 300, the processor 302 executes program code instructions that control device operations. The processor 302, memory/storage 303, network interface 304, display 305 and input/output 306 are conventional, and therefore in order to avoid obfuscating the inventive aspects of this disclosure, such conventional aspects are not discussed in detail herein.

The apparatus 300 includes the network interface 304 for communications through a network, such as communications through the network 105 with the multi-function document processing device (or another device) in FIGS. 1, 2A and 2B. However, it should be appreciated that the subject matter of this disclosure is not limited to such configuration. For example, the apparatus 300 may communicate with devices through direct connections and/or through a network to which some of the components shown in FIGS. 1, 2A and 2B are not connected. As another example, the apparatus 300 does not need to be provided by a server that provides services to clients, but rather may communicate with the devices on a peer basis, or in another fashion.

The apparatus 300 of the present disclosure is not limited to a server or computer, but can be manifested in any of various devices that can be configured to communicate over a network and/or the Internet.

Figure 4:
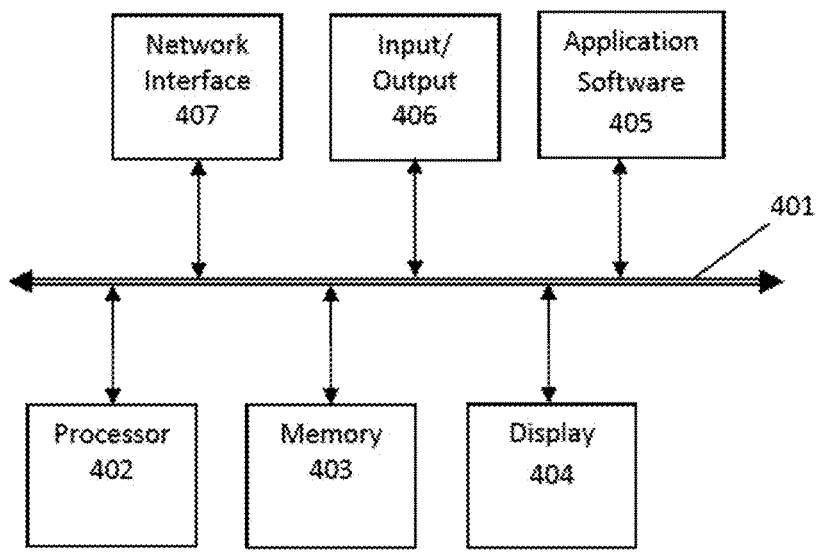
FIG. 4 shows a block diagram of an exemplary configuration of a computer that can be configured as a host for a device administration application, referenced in FIGS. 2A and 2B.

An exemplary constitution of a computer on which the device administration application 202 of FIG. 2A and FIG. 2B may be installed is shown schematically in FIG. 4. In FIG. 4, apparatus 400 includes a processor (or central processing unit) 402 that communicates with a number of other components, including memory 403, display 404, application software 405, input/output (such as keyboard, mouse, touchpad, stylus, microphone and/or speaker with voice/speech interface and/or recognition software, etc.) 406, network interface 407, by way of an internal bus 401.

The memory 403 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 407 provides a connection (for example, by way of an Ethernet connection or other network connection which supports any desired network protocol such as, but not limited to TCP/IP, IPX, IPX/SPX, NetBEUI, etc.) to the network to which the computer 400 is connected (e.g., network 105 of FIGS. 1, 2A and 2B).

Additional aspects or components of the computer 400 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

FIG. 5 shows a schematic diagram of a configuration of a scanning device as an MFP (multi-function printer or multi-function peripheral), which can be any apparatus that has provisions (such as, for example, via a microprocessor chip or a collection of devices having varying degrees of integration) to perform one or more functionalities in addition to scanning a hardcopy document. The MFP 500 shown in FIG. 5 includes a controller 502, and various elements connected to the controller 502 by an internal bus 501. The controller 502 controls and monitors operations of the MFP 500. The elements connected to the controller 502 include storage 503 (for example, random access memory, read-only memory, hard disk drive, portable storage media drive such as for optical discs, magnetic discs, magneto optical discs, etc., semiconductor memory cards, combinations of storage media, etc.), scanning 504, printing 505, a converter 506, a network interface (I/F) 507, and a user interface 508.

Storage 503 can include one or more storage parts or devices [e.g., a read only memory (for example, ROM, PROM, EPROM, EEPROM, etc.), a random access memory (RAM), a hard disk drive (HDD), portable media (for example, floppy disk, optical disc, magnetic discs, magneto-optical discs, semiconductor memory cards, etc.) drives], and program code instructions can be stored in one or more parts or devices of storage 503 and executed by the controller 502 to carry out the instructions. Such instructions can include instructions for performing specified functions (such as printing, scanning, faxing, copying, e-mailing, etc.) of the MFP 500, to enable the MFP 500 to interact with a terminal, as well as perhaps other external devices, through the network interface 507, and interactions with users through the user interface 508.

The network interface 507 is utilized by the MFP 500 to communicate with other network-connected devices such as a terminal, a server and receive data requests, print jobs, user interfaces, and etc.

The user interface 508 includes one or more electronic visual displays that display, under control of controller 502, information allowing the user of the MFP 500 to interact with the MFP 500. The electronic visual display can be any of various conventional displays (such as a liquid crystal display, a plasma display device, a cathode ray tube display, etc.), but preferably is equipped with a touch sensitive display (for example, liquid crystal display) and is configured to provide a GUI (graphical user interface) based on information input by an operator of the MFP 500, so as to allow the operator to interact conveniently with services provided on the MFP 500, or with the MFP 500 serving as terminal for accessing electronic data or other content through the network. User interfaces or other contents received through the network via the network interface 507 can be displayed on the display screen.

The display screen does not need to be integral with, or embedded in, a housing of the MFD 500, but may simply be coupled to the MFD 500 by either a wire or a wireless connection. The user I/O 508 may include keys and/or buttons (such as graphical keys or buttons, or other graphical elements, of a GUI on a touchscreen display 508) for inputting information or requesting various operations. Alternatively, the user I/O 508 and the display screen may be operated by a keyboard, a mouse, a remote control, voice recognition, or eye-5 movement tracking, or a combination thereof.

Since the MFD 500 is typically shared by a number of users, and is typically stationed in a common area, the MFD 500 preferably prompts the user to supply login credentials or authentication information, such as user name (or other user or group information), password, access code, etc. The user credentials may also be stored for the session and automatically supplied if access to other devices through the network requires it. On the other hand, such other devices may prompt the user to supply other user credentials through the user interface.

Other methods of authentication may also be used. For example, the MFD 500 may be equipped with a card reader or one or more biometrics means (such as comparing fingerprints, palm prints, voice or speech, retinas or irises, facial expressions or features, signature, etc.). The MFD 500 may communicate the user credentials, provided in the manners discussed above, to other devices or applications connected to the MFD 500 via a network (e.g., the network 105 of FIGS. 1 and 2) for determining authorization for performing jobs.

Scanning 504, printing 505, and network interface 507 are otherwise conventional, and therefore, a detailed description of such conventional aspects is omitted in the interest of clarity and brevity. The MFP 500 can have any or all of the functions of similar devices conventionally known, such as for scanning, editing and storing images, sending a fax, sending and receiving e-mails with or without attachments, accessing files by FTP or another protocol or facility, surfing the Web, send-to-folder, scan-to-email, etc. Further, multi-functional devices or multi-function peripheral devices can play a prominent role to convert hardcopy documents to electronic documents.

FIG. 6 illustrates an example of a user interface provided by the device administration application 202 depicted in FIG. 2A and FIG. 2B that allows an administrator to specify the appearance of the document identifier image that is to be applied to the scan document image.

As shown in FIG. 6, the administrator may, via the "Top/Bottom Margin" option and the "Left/Right Margin" option specify top and bottom margins and left and right margins which may be appended to each document image amongst the scan document images. The document identifier may be imprinted by the document identifier stamper module 103 in such appended margin on the document image. In addition, an orientation or rotation (in degrees) of the document identifier relative to the scan document image in the output file may be specified via the "Rotation (Degree)" item. The administrator may also specify (i) a background color (e.g. black, white, red, green, blue, cyan, magenta, yellow, orange, pink, gray, light gray, dark gray, or transparent) via the "Background Color" drop down menu, (ii) a border color (e.g. black, white, red, green, blue, cyan, magenta, yellow, orange, pink, gray, light gray, or dark gray) via the "Border Color" drop down menu, and (iii) a border width (e.g. 0, 1, 2, 3, 4, or 5) via the "Border Width" option, of the document identifier image. Such settings entered by an administrator, along with the values specified by MFP users, determine the appearance of the document identifier image to be applied to the particular scan document image.

In an exemplary embodiment, the administrator may enter a display name (e.g. "PDF Stamper" in FIG. 6) which correspond to this particular stamper and set of stamper settings. The set of stamper settings may be associated with a Bates number that is unique to the particular document image or set of document images. Each of the sets of stamper setting may have a stamper display name and a Bates number counter registering a next Bates number to be used with the set of stamper settings, and the device user may be permitted to select one of the sets of stamper settings to be applied, as shown in FIG. 8. In FIG. 8, a device user may choose from either the stamper (or "set") with display name "ABC Corporation Matter" or the stamper or set with display name "XYZ Corporation Matter", and in this example the user has selected the "ABC Corporation Matter" set. Each particular document image in the "ABC Corporation Matter" set may have a unique Bates number, and the set includes a Bates number counter to register a next Bates number to be used with the set of stamper settings for "ABC Corporation." Thus, the device user of the multi-function document processing apparatus 201 does not have to spend time figuring out and inputting the desired Bates numbers for a particular set of documents. Rather, the device user may simply select one of the display names corresponding to a particular stamper or set of stamper settings to ensure the documents are to be identified properly.

It should be noted that while the user may select a display name that corresponds to a particular stamper or set of settings, the user may not necessarily be able to change any stamper settings by selecting such display name. In such embodiment, the settings workflow terminates upon user selection of a display name (in, for example, the GUI shown in FIG. 8). Thus, after a user selects a particular set of settings, processing of the scan document images according to the settings of the selected stamper or set may immediately begin without the opportunity for the user to change any stamper settings.

In another embodiment, a configuration GUI may be presented after selection of the stamper or set. In such case, for the fields that only exist on the General Settings screen of FIG. 6, and not the configuration GUI of FIG. 9, those values may be set by the administrator and used such that no change by the device user is permitted. The values that may not be changed by the device user may appear in the "Hidden Items (Preset)" section of FIG. 9 such that the values are invisible to device users. On the other hand, when a field exists on both the General Settings GUI of FIG. 6 and the configuration GUI of FIG. 9, the value specified in the configuration display by the administrator may be displayed as the default such that users can change the value if desired. In this case, the administrator may have the flexibility to determine which settings the user may change, and which settings may remain the same across all jobs. Thus, after selecting a particular set of settings (such as "ABC Corporation Matter" in FIG. 8), the user may have the opportunity to change certain stamper settings.

FIG. 7 illustrates another example of a user interface provided by the device administration application 202 depicted in FIG. 2A and FIG. 2B that allows an administrator to further specify the appearance of the document identifier image to be applied to scan documents, as well as preview such appearance. As shown in FIG. 7, the administrator may enter a display name (i.e. "PDF Stamper"), a prefix which may appear before the document identifier (via the "Prefix" option), a number of "Leading Spaces" that may appear before the prefix and the document identifier (via the "Leading Spaces" option), and a "Suffix" that may appear after the document identifier (via the "Suffix" option). The prefix and/or suffix may include numbers, letters, symbols, etc. and may include text such as a set number, case number, firm name or date to uniquely identify particular documents or sets of documents. In another example, a number of "Trailing Spaces" that may appear after the document identifier may be specified via the "Trailing Spaces" option. The "Counter Start" option allows the administrator to specify a start number for the document identifier and the "Number of Digits" option allows the administrator to specify the number of spaces between the prefix and the suffix. It should be noted that the number of digits option may be ignored if the value for the "Counter Start" setting is greater than the "Number of Digits" value.

The "Vertical" option allows the administrator to choose between a top, middle or bottom alignment in the vertical direction for the document identifier, and the "Horizontal" option allows specification of a left, center, or right alignment in the horizontal direction for the document identifier. The "Font Family" option allows the administrator to set a font for the document identifier (e.g. Courier, Helvetica, Times Roman, etc.), the "Font Style" drop down menu allows the administrator to specify a particular font style (e.g. Normal, Bold, Italic, Bold Italic, etc.), the "Font Size" option allows the administrator to choose a particular font size for the document identifier (e.g. 6, 9, 10, 11, 12, 14, 16, 18, 20, 22, 24, 26, 28, 36, 48, 72, etc.), and the "Font Color" option allows the administrator to choose a font color for the document identifier (i.e. black, white, red, green, blue, cyan, magenta, yellow, orange, pink, gray, light gray, dark gray, etc.).

In an exemplary embodiment, the administrator may also utilize the (i) "Page Size" drop down to select a page size to display when previewing the document identifier images (e.g. A0, A1, A2, A3, A4, A5, A6, 8.5×14 inch, 28×24 inch, etc.) and (ii) the "Page Orientation" radio button to specify whether the preview should be in landscape orientation or portrait orientation. The administrator may then click the "Show Preview" button in FIG. 7 to open a new PDF window that displays a preview of the document identifier on a sample PDF document in the specified page orientation and page size.

FIG. 9 illustrates an example of how the administrator may remotely configure the appearance of the graphic user interface (GUI) screen provided by the operational display of the MFP. From this screen, the administrator may set default values and limit which fields are available to users. When a field exists on both the General Settings GUI of FIG. 6 and the configuration GUI of FIG. 9, the value specified in the configuration display may be displayed as the default such that users can change the value if desired. For the fields that only exist on the General Settings screen of FIG. 6, those values may be used such that no change by the device user is permitted.

The document identifier may be, for example, a Bates number, as shown in the top right corner of the three scan document images in FIG. 10. In this example, the Bates number for the top-most document is "A00000101", the Bates number for the middle document is "A00000102, and the Bates number for the bottom-most document is "A00000103". It should be noted that the Bates number for each document is incremented. As can be appreciated, although the Bates number "A00000101" overlaps the text "NON-DISCLOSURE" of the scan document image of the top-most document, the document identifier image is over-transparent to the scan document image such that the information of the scan document image is still visible. Thus, the Bates number does not interfere with the data on the scan document image, thereby allowing for easier user comprehension of the scan document image.

In another exemplary embodiment, the user of the multi-function document processing device does not have to specify stamper settings, and instead may simply utilize the default values set by the administrator. One example of a reason why the user would rather have the stamper settings preset on the multi-function document input device rather than configuring such stamper settings themselves is because the user may be able to save time and stamp scan document image more efficiently. In other words, the user is not required to spend time determining which stamper settings and bates number should correspond to which particular set of scan documents.

Figure 11:
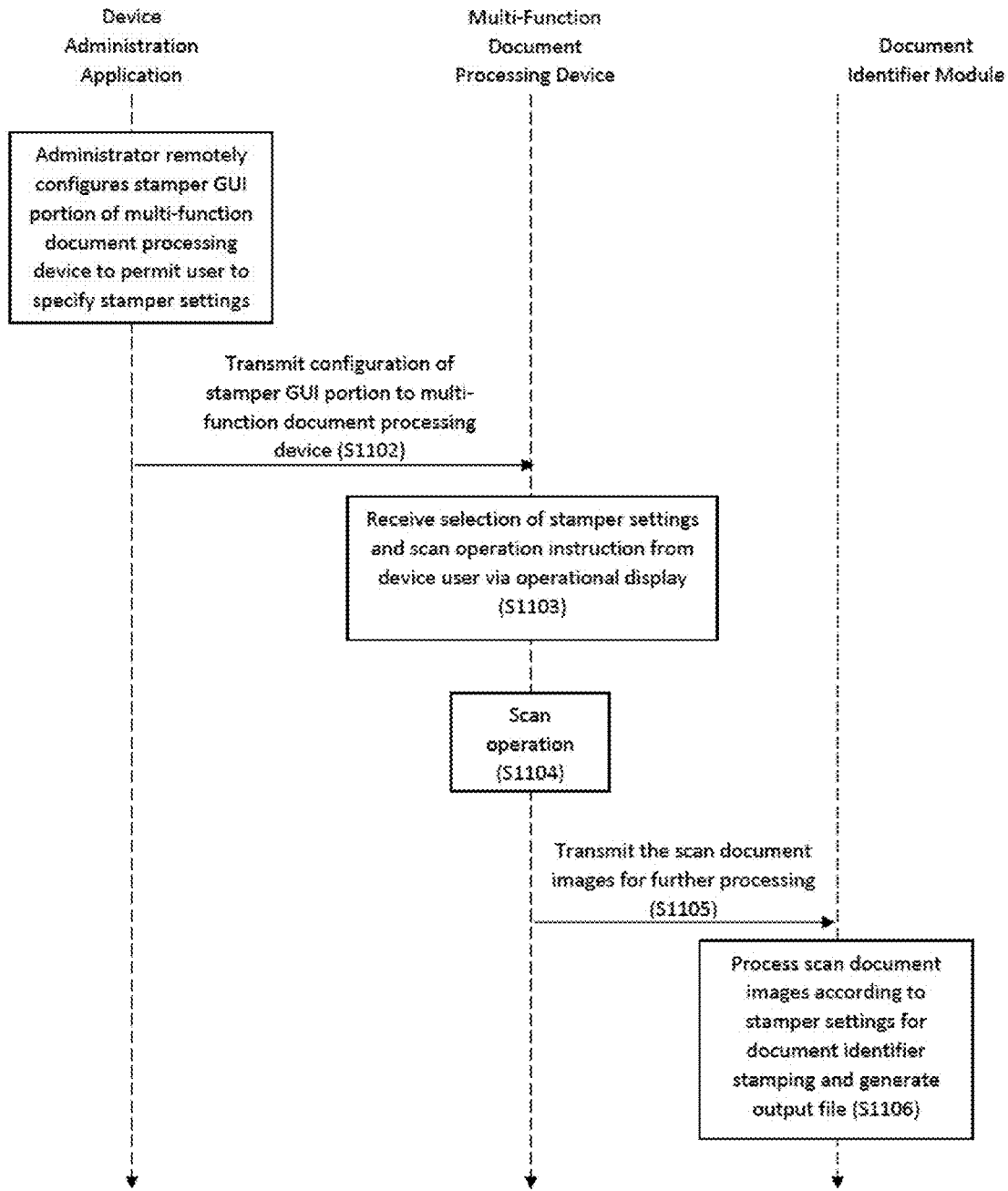
FIG. 11 illustrates a schematic diagram demonstrating a typical workflow, such as in any of the systems shown in FIGS. 1, 2A and 2B.

In FIG. 11, there is shown a schematic diagram of a data flow in a system, such as system 200A illustrated in FIG. 2A, according to an exemplary embodiment.

In S1101, the administrator configures the stamper GUI portion 102a-1 via the device administration application 202 to permit the user of the multi-function document processing device 201 to specify stamper setting. In S1102, the device administration application 202 transmits the configuration of the stamper GUI portion to the multi-function document processing device 201. In S1103, the stamper GUI portion 201a-1 of the multi-function document processing device 201 receives a user selection of specified stamper settings, and a user instruction corresponding to a scan operation instruction (S1104). In S1105, the multi-function document processing device 201 transmits the scan document image data to the document identifier module 103 for further processing, and in S1106, the document identifier module 103 processes the scan document image data according to stamper settings for document identifier stamping. More specifically, the document identifier stamper module imprints, on each particular document image amongst the scan document images, a document identifier image unique to, and uniquely identifying, the particular document image and generates an output file capturing the set of scan document images. Such output file may include an overlay of respective unique document identifier images.

The aforementioned specific embodiments are illustrative, and many variations can be introduced on these embodiments without departing from the spirit of the disclosure or from the scope of the appended claims. Further, although the aspects, features and advantages are discussed herein in connection with a document processing apparatus and system, it should be understood that such aspects and features may be integrated in a program that is not application software per se, but may be instead, for example, an operating system, a snap-in, a plug-in, an add-on, an extension, or another program not normally referenced as an application.

In addition, elements and/or features of different examples and illustrative embodiments may be combined with each other and/or substituted for each other within the scope of this disclosure and appended claims.

What is claimed is:

1. A document processing system comprising:
a multi-function document processing device including:
   a document scanner to scan a hardcopy document and generate a set of one or more scan document images, and submit the scan document images for further processing; and
   an operational display to provide a graphical user interface (GUI);
a device administration application embodied in a non-transitory storage medium and executable by a computer to provide a stamper GUI portion configured according to operational instruction by a document production administrator and displayed on the operational display of the multi-function document processing device to permit a device user to select a set of stamper settings for document identifier stamping; and
a document identifier stamper module embodied in a non-transitory medium and executable by a processor to process the scan document images according to the selected set of stamper settings for document identifier stamping, wherein the document identifier stamper module imprints, on each particular document image amongst the scan document images, a document identifier image unique to, and uniquely identifying, the particular document image, and generating an output file capturing the set of the scan document images with overlay of respective unique document identifier images, and
wherein the device administration application maintains one or more sets of stamper settings, and each set of stamper settings amongst said one or more sets of stamper settings is associated with a corresponding stamper display name describing a particular matter for which the scan document images are being processed, and
for each stamper set amongst the sets of stamper settings, the stamper GUI portion, configured by the device administration application and provided on the operational display of the multi-function document processing device, displays the stamper display name of the stamper set, to permit selection, by stamper display name, of one of the sets of stamper settings to be applied, and the stamper settings of the stamper set are not modifiable through the stamper GUI portion, and upon selection of the stamper set, processing of the scan document images in accordance with the stamper settings of the selected stamper set commences (i) without opportunity for any of the stamper settings in the selected set to be changed and (ii) without any of the stamper settings in the selected stamper set being displayed on the operational display of the multi-function document processing device.

2. The document processing system as claimed in claim 1, wherein the device administration application provides a general settings GUI to permit the document production administrator to specify aspects of the document identifier image that cannot be changed by the device user.

3. The document processing system as claimed in claim 2, wherein
the document identifier image overlay to be imprinted by the document identifier stamper module on the scan document image captures a document identifier including a Bates number unique to the particular document image, and
the general settings GUI permits the document production administrator to specify at least one of a prefix and a suffix to be applied, in addition to the Bates number, in the document identifier.

4. The document processing system as claimed in claim 3, wherein the general settings GUI permits the document production administrator to specify a number of digits to be allocated for the Bates number, in the document identifier.

5. The document processing system as claimed in claim 1, wherein the device administration application provides a stamper preview part in the stamper GUI portion to permit preview of the document identifier image to be applied based on a specified set of stamper settings.

6. The document processing system as claimed in claim 1, wherein the document identifier image additionally includes date and time marks.

7. The document processing system as claimed in claim 1, wherein the document identifier image overlay by the document identifier stamper module on the scan document image in the output file is over-transparent to the scan document image so as to keep visible the image information on the scan document image that overlaps with the document identifier image.

8. The document processing system as claimed in claim 1, wherein the stamper GUI portion includes provisions for the user to select from plural candidate fonts a font to be used for the document identifier, independent of fonts used for the hardcopy document or the scan document images captured in the output file.

9. The document processing system as claimed in claim 8, wherein the stamper GUI portion includes provisions for the user to select from plural color candidates a font color to be used for the document identifier, independent of colors, if any, used for the hardcopy document or the scan document images captured in the output file.

10. A multi-function document processing apparatus comprising:
a document scanner to scan a hardcopy document and generate a set of one or more scan document images, and submit the scan document images for further processing;
an operational display to provide a graphical user interface (GUI) including a stamper GUI portion to select a set of stamper settings for document identifier stamping; and
a document identifier stamper module embodied in a non-transitory storage medium and executable by a processor to process the scan document images according to the selected set of stamper settings for document identifier stamping, wherein the document identifier stamper module imprints, on each particular document image amongst the scan document images, a document identifier image unique to, and uniquely identifying, the particular document image, and generating an output file capturing the set of the scan document images with overlay of respective unique document identifier images, and wherein
the document identifier stamper module maintains one or more sets of stamper settings, and each set of stamper settings amongst said one or more sets of stamper settings is associated with a stamper display name describing a particular matter for which the scan document images are being processed, and
for each stamper set amongst the sets of stamper settings, the stamper GUI portion, configured by the device administration application and provided on the operational display of the multi-function document processing device, displays the stamper display name of the stamper set, to permit selection, by stamper display name, of one of the sets of stamper settings to be applied, and the stamper settings of the stamper set are not modifiable through the stamper GUI portion, and upon selection of the stamper set, processing of the scan document images in accordance with the stamper settings of the selected stamper set commences (i) without opportunity for any of the stamper settings in the selected set to be changed and (ii) without any of the stamper settings in the selected stamper set being displayed on the operational display of the multi-function document processing device.

11. The multi-function document processing apparatus as claimed in claim 10, wherein the stamper GUI portion includes provisions for a user to specify relative positioning in a vertical direction and relative positioning in a horizontal direction, to overlay the document identifier image on the scan document image in the output file.

12. The multi-function document processing apparatus as claimed in claim 11, wherein the document identifier image is imprinted at the same position on each document image amongst the scan document images captured in the output file, by the document identifier stamper module, in accordance with the relative positioning in the vertical direction and relative positioning in the horizontal direction, specified by the user through the stamper GUI portion.

13. The multi-function document processing apparatus as claimed in claim 10, wherein the document identifier image overlay by the document identifier stamper module on the scan document image in the output file captures a document identifier including a Bates number unique to the particular document image.

14. The multi-function document processing apparatus as claimed in claim 13, wherein each set of stamper settings having the associated stamper display name corresponding to the particular matter for which the scan document images are being processed and includes a Bates number counter registering a next Bates number to be used with the set of stamper settings.

15. The multi-function document processing apparatus as claimed in claim 10, wherein the stamper GUI portion includes provisions for the user to specify an orientation of the document identifier relative to the scan document image in the output file.

16. The multi-function document processing apparatus as claimed in claim 10, wherein the stamper GUI portion includes provisions for a user to specify a margin to be appended to each document image amongst the scan document images, and wherein for said each document image amongst the scan document images captured in the output file, the document identifier is imprinted by the document identifier stamper module in said appended margin on the document image.

17. The multi-function document processing apparatus as claimed in claim 10, further comprising:
   a network interface to connect the multi-function document processing apparatus to a network, and through which the multi-function document processing apparatus communicates with other devices connected to the network; and
   a send-to-folder module to transmit the output file capturing the set of scan document images with overlay of the respective unique document identifier images, through the network interface via the network to a specified storage destination.

* * * * *